Nov. 22, 1927.
E. TIMBS
1,649,995
CROWN BLOCK BEARING SHEAVE UNIT
Filed April 25, 1927
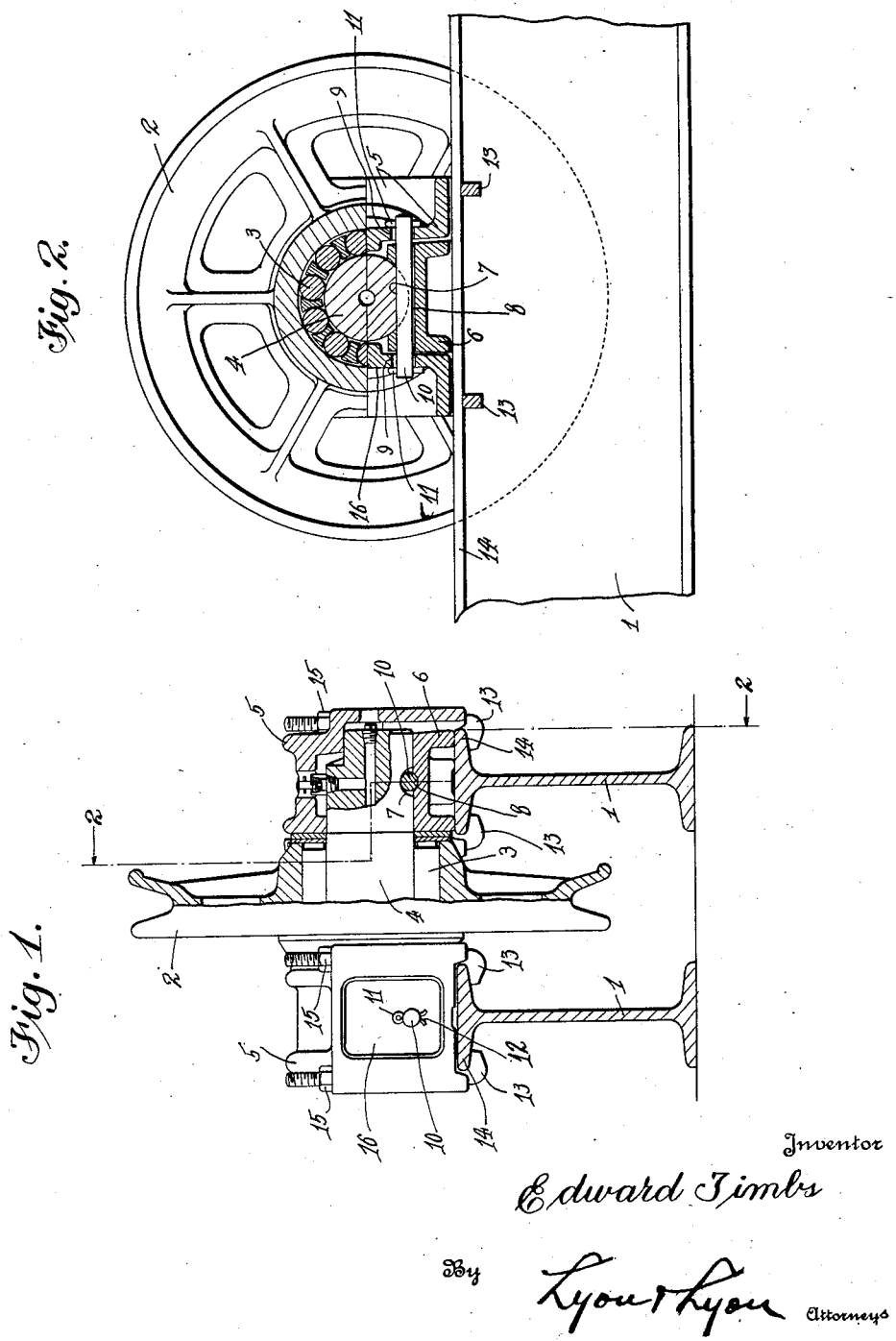
Inventor
Edward Timbs
By Lyon & Lyon
Attorneys Patented Nov. 22, 1927.

1,649,995

UNITED STATES PATENT OFFICE.

EDWARD TIMBS, OF LOS ANGELES, CALIFORNIA, ASSIGNOR TO THE NATIONAL SUPPLY COMPANY OF DELAWARE, OF NEW YORK, N. Y., A CORPORATION OF DELAWARE.

CROWN-BLOCK BEARING-SHEAVE UNIT.

Application filed April 25, 1927. Serial No. 186,238.

This invention relates to crown block bearing sheave units, and is more particularly related to a crown block bearing sheave unit adapted to be mounted on the top or crown of an oil well derrick.

Oil well derricks as now commonly used are approximately 118 to 124 feet in height, and are provided at their crowns with blocks carrying pulleys, over which cables are trained for hoisting well casing, drill stem, tubing, rods and the like, during the drilling and operation of the oil wells. The accurate positioning and aligning of these pulleys is difficult, and in order to accurately align the same, it is essential that the pulleys be so constructed as to provide a unitary structure which may be hoisted into position without liability of the supporting boxes or the shafts upon which the pulleys are mounted rotating out of line in relation to the pulley shaft, and it is also essential that these boxes be so constructed as to permit the same to be readily disassembled on the crown of the oil well rig, so that the parts thereof may be replaced or repaired as the same wear.

It is therefore an object of this invention to provide a crown block bearing sheave unit which may be assembled as a unit upon the floor of the derrick, and hoisted in position so that the shaft boxes which support the shaft at its opposed ends will remain aligned with one another and in a definite relation with the sheave or pulley shaft upon which the pulley or sheave is mounted intermediate the boxes.

Another object of this invention is to provide a crown block bearing sheave unit which is adapted to be assembled on the floor of the derrick, and which includes a pulley and pulley shaft upon which the pulley is rotatably mounted on bearings, boxes for the opposed ends of the shaft including pillow blocks upon which the ends of the shaft are mounted, the shaft and pillow blocks being provided with recesses aligned with holes formed in the boxes and through which recesses and holes pins are passed and secured by means of cotter pins removably secured to the ends of the pins on the exterior of the blocks.

Other objects and advantages of this invention it is believed will be apparent from the following detailed description of a preferred embodiment thereof, as illustrated in the accompanying drawing.

In the drawing:—

Figure 1 is a front elevation partly in vertical mid section of a crown block bearing sheave unit embodying this invention.

Figure 2 is a sectional end elevation taken substantially on the line 2—2 of Fig. 1.

In the preferred embodiment of this invention illustrated in the accompanying drawing, I illustrates a pair of I-beams, such as are customarily secured in position in spaced relation at the top or crown of an oil well derrick (not shown). The I-beams 1 are provided for supporting cable sheaves or pulleys 2, over which a cable is trained and secured at one end to a hoist (not shown), and at its opposite end to an elevator, hook or the like, for hoisting well casing, drill stem, well tubing or sucker rods, as is well understood in the art.

The pulley 2 is mounted upon bearings 3, which may be of any suitable or desirable construction, upon a shaft 4. The shaft 4 is provided at its opposed end with boxes 5. The boxes 5 are preferably cast so as to receive at their bottoms pillow blocks 6, upon which the shaft 4 is supported at its opposed ends.

Means are provided for detachably securing together the boxes 5, pillow blocks 6 and shaft 3 so as to provide a unit assembly structure to maintain the pillow blocks 6 and boxes 5 in definite relation with the shaft 4 as the same is hoisted or raised to the position upon the crown of the well derrick, which means are preferably of the following construction:

Formed at the bottom edge of the shaft 4 are arcuate recesses 7. Formed in the pillow blocks 6 are complementary arcuate recesses 8. The recesses 7 and 8 are formed in the shaft 4 and pillow blocks 6 in alignment with holes 9 formed in the boxes 5. Pins 10 are passed through the recesses 7 and 8 and through the holes 9 formed in the boxes 5, and are provided on the exterior of the boxes 5 with cotter pins 11 which are passed through bores formed in the ends of the pins 10, and spread apart at their ends 12 so as to secure the pins 10 in position, and also so as to provide an easy detachable means which may be easily removed to permit the pins 10 to be removed, and permitting the boxes 5 to be removed from the ends of the shaft 4 when it is desired to replace or repair any of the parts of the structure.

In order to secure the boxes 5 to the spaced I-beam 1, hook bolts 13 are preferably provided and pass through holes formed in the boxes 5 and hook under the webs 14 of the I-beams 1 and are provided at their opposite ends with nuts 15 which are screw-threaded to the bolts 13.

The pins 10 project from the boxes 5 through the depressed faces 16 formed in the casting of the boxes 5 so that the ends of the pins 10 and the cotter pins 12 are mounted within recesses formed in the boxes 5 to permit the same catching upon other objects in the well derrick as the same are hoisted to position on the crown of the derrick.

Having fully described my invention, it is to be understood that I do not wish to be limited to the details herein set forth, but my invention is of the scope of the appended claims.

I claim:

1. In a crown block, the combination of a pulley, a shaft, bearings rotatably supporting the pulley on the shaft, boxes for the opposed ends of the shaft, pillow blocks mounted within the boxes, complementary recesses formed in horizontal position in the pillow block and shaft and aligned with holes formed in the boxes, pins passed through the holes and recesses, and cotter pins removably secured to the ends of the pins exteriorly of the boxes.

2. In a crown block, the combination of a pulley, a shaft, bearings rotatably supporting the pulley on the shaft, boxes for the opposed ends of the shaft, pillow blocks mounted within the boxes, pins passed through complementary recesses formed in the pillow blocks and shaft and extending exteriorly of the boxes, and means detachably secured to the opposed ends of the pins for removably securing the same in position.

3. In a crown block, the combination of a pulley, a shaft, bearings rotatably supporting the pulley on the shaft, boxes for the opposed ends of the shaft, pillow blocks mounted within the boxes for supporting the opposed ends of the shaft, horizontally disposed pins passed through complementary recesses formed in the shaft and pillow blocks at the opposed ends of the shaft and extending through the boxes, and means secured to the ends of the pins for removably securing the same in position.

Signed at Torrance, California, this 13th day of April, 1927.

EDWARD TIMBS.